D. AND E. ERICSON.
SPLASH SCREEN FOR AUTOMOBILES.
APPLICATION FILED JULY 23, 1919.
1,411,612.
Patented Apr. 4, 1922.
2 SHEETS—SHEET 2.
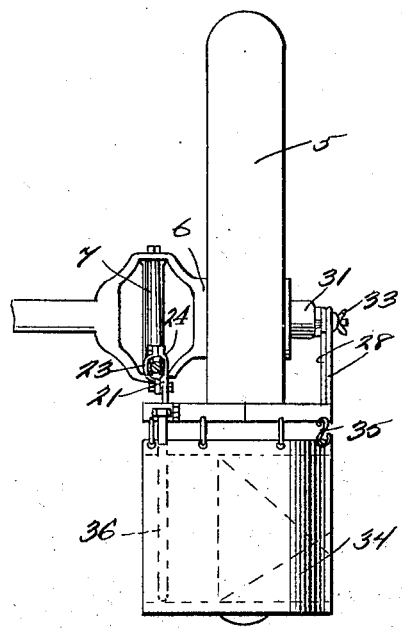
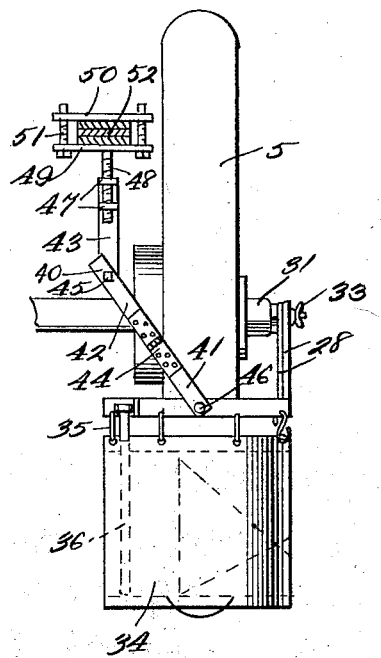
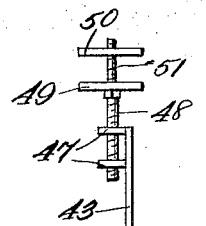
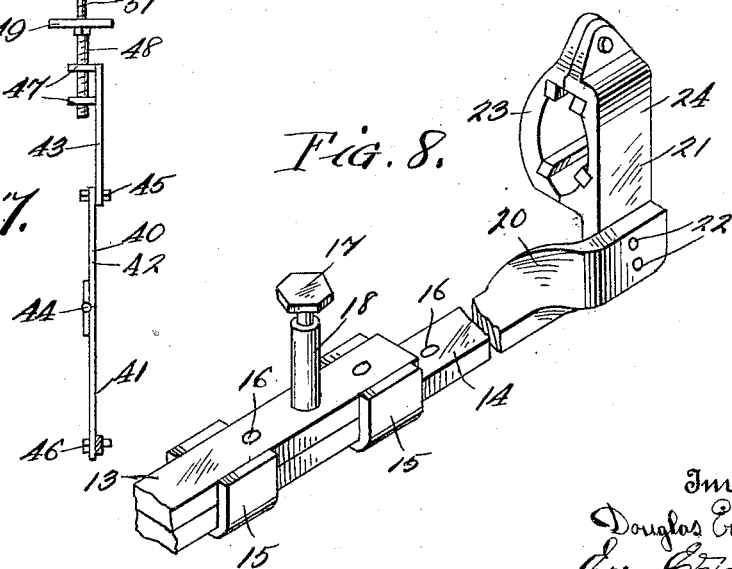

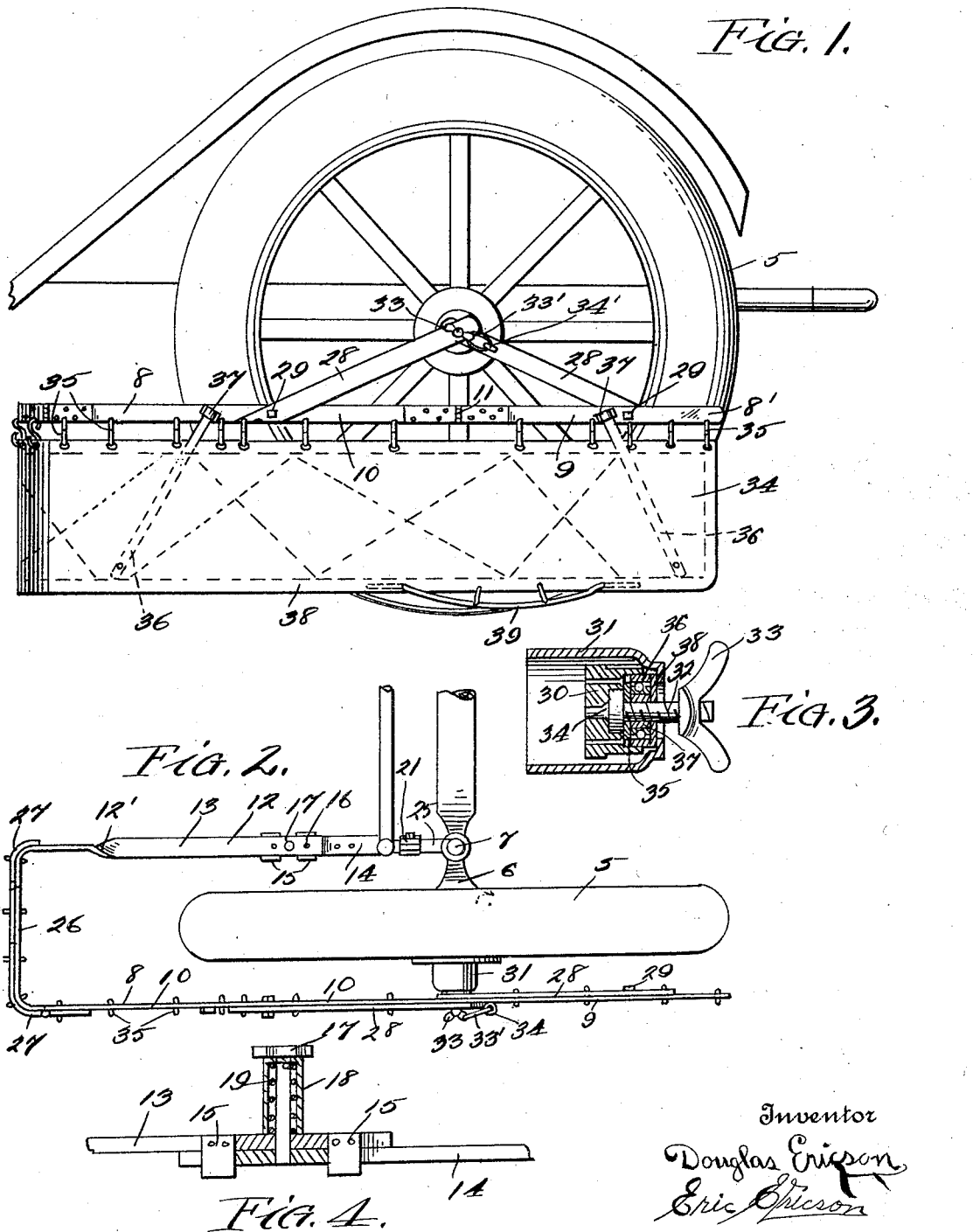

UNITED STATES PATENT OFFICE.

DOUGLAS ERICSON AND ERIC ERICSON, OF CAMBRIDGE, MASSACHUSETTS.

SPLASH SCREEN FOR AUTOMOBILES.

1,411,612.  Specification of Letters Patent.  Patented Apr. 4, 1922.

Application filed July 23, 1919. Serial No. 312,800.

*To all whom it may concern:*

Be it known that we, DOUGLAS ERICSON and ERIC ERICSON, citizens of the United States and Sweden, respectively, and both residing at Cambridge, in the county of Middlesex and State of Massachusetts, have invented certain new and useful Improvements in a Splash Screen for Automobiles, of which the following is a specification.

Our invention relates to splash screens for automobiles, or the like, the primary object of which is to provide a device of this character which is light in construction, easy to attach to any machine without materially altering the same, reliable in its operation, and inexpensive to manufacture.

A further object of the invention is to provide a device of the above mentioned character that is normally held in a set position, but is free to yield in any direction should it be necessary.

A further object of the invention is to provide a device of the above mentioned character that will prevent the splashing of mud from the rear of the wheel, as well as the side, thus increasing its practicability.

A further object of the invention is to provide a device of the above mentioned character that is of a collapsible structure, being capable of folding into a very small compass to fit within a tool box or other suitable place.

A further object of the invention is to provide a device of the above mentioned character that when attached to a machine will not interfere with its operation and may be quickly swung to a position to permit the removal of the tire if desired.

A further object of the invention is to provide a device of the above mentioned character having an improved novel means whereby the splash screen is rigidly secured in its adjusted position, thus eliminating the possiblity of undesirable noises usually caused by the attachment of accessories to automobiles.

Other objects and advantages of this invention will be apparent during the course of the following description.

In the accompanying drawings forming a part of this specificaton and in which like numerals are employed to designate like parts throughout the same, Figure 1, is a side elevation of the front wheel of a vehicle showing our improvements attached thereto.

Figure 2, is a view looking from the top of a wheel showing our novel means for attaching the improvement thereto.

Figure 3, is a detailed sectional view of our improved hub cap used in connection with our improvement.

Figure 4, is a detailed longitudinal sectional view of our improved adjusting means.

Figure 5, is a rear view of the front wheel of a vehicle showing our improvements attached thereto.

Figure 6, is a rear view of the rear wheel of a vehicle showing the novel structure for attaching the same thereto.

Figure 7, is a detailed side view of the supporting member used in connecting our improvement to the rear wheel of a vehicle, and Figure 8, is a fragmentary perspective view of the adjustable rod used in connecting our improvements to the front wheel of a vehicle.

In the drawings, wherein for the purpose of illustration we have shown a preferred embodiment of our invention, the numeral 5 designates the wheel of a vehicle mounted on the axle 6, and equipped with the usual spindle 7. This wheel is of the usual type, merely being shown for the purpose of illustrating the way in which our improvements are attached thereto.

The improvement above referred to consists of a frame 8, a section of which 8′ extends laterally along the outer side of the wheel and a substantial distance beyond the rear edge thereof. This section 8′ is formed of two pieces 9 and 10 which are hingedly connected together as at 11. Extending along the inner side of the wheel is an adjustable horizontal bar 12, forming a part of the frame and also formed of two pieces 13 and 14 as clearly shown in Figure 8. The end of the piece 13 is provided with a pair of spaced U-shaped brackets 15 forming a bearing to slidably receive the end of the piece 14, thus making an adjustable connection between the pieces. These two ends are apertured as at 16, to receive the locking pin 17 enclosed in the casing 18 and normally held in its locked position by the tension of the spring 19 as shown in Figure 4. The opposite end of the piece 14 is twisted as at 20, and then secured to the clamp 21 by rivets or other suitable means 22. This clamp comprises two upright members 23 and 24 which extend slightly above the bars and are adapted to embrace the arm 25 of the spindle 7, for rigidly supporting the adjustable bar 12 in a parallel plane with the ground. The free end of the adjustable bar 12 is twisted, as at 12′, and connected to the free end of the section 8′ through the medium of the cross bar 26, which holds the bars in spaced relation. This cross bar is connected to the bars 12 and 8′ by the outwardly swinging hinges 27.

In order that the outside section of the frame will be supported in a parallel position, we have provided a pair of oppositely extending rods 28 which are pivotally connected to the pieces 9 and 10 respectively. These rods are inclined upwardly and apertured at their upper ends for attachment to the hub cap. When attaching my improvement, a novel hub cap 31 is substituted for the one usually used and consists of a recess casting 30 loosely mounted within the hub cap 31 of the usual configuration, but slightly longer. A screw threaded bolt 32 having a flange 33 is seated within the recess 34, being held therein by the washer 35. Seated upon the washer 35 is a ball bearing roller 36 equipped with a collar 37, in which the screw threaded bolt 32 is journaled. To prevent frictional engagement of the roller with the casing, a second washer 38 is placed on the bolt 32. The outer end of this bolt passing through the apertured ends of the rods 28 which are held in place by the wing nut 33, said nut being locked by the link 33′ which is connected to the eye screw 34′. Thus it is clearly obvious that the frame of my improved invention will be supported in a rigid and parallel position.

The splash screen or apron 34 is made from any suitable material, but preferably canvas. The screen is attached to the section 8′ and cross bar 26 of the frame, through the medium of the S shaped hooks 35 received in the openings provided for this purpose along the upper edge of the apron and the lower edge of the frame. This screen extends downwardly from the frame to a distance in close proximity to the ground, being held in a substantial stationary position by the brace strips 36 which are inclined upwardly and connected to the frame by the brackets 37. The lower hem of the screen 38 is provided directly opposite the wheel with a curved rod 39 which projects downwardly so as to eliminate any possibility of mud being splashed past the screen by the wheel.

As shown in Figure 6, when the screen is attached to the rear wheel of the vehicle, the adjustable part 12 is eliminated and in lieu thereof a supporting member 40 is substituted. This member comprises three sections 41, 42, and 43, of which sections 41 and 42 are hingedly connected together by the hinge 44, and sections 42 and 43 by the pivot pin 45. The free end of the section 41 is pivoted to the cross bar 26, as at 46, while the free end of the section 43 is equipped with a pair of spaced apart apertured lugs 47, in alinement with each other. These lugs are adapted to receive the screw threaded shank 48 which projects downwardly from the lower clamping plate 49. A second plate 50 is joined to the first mentioned plate by the adjusting screws 51, which clamp the plates about the spring 52 of the vehicle.

In operation, when it is desired to attach our improvements to a vehicle, the hub cap of the wheel is removed and our novel hub cap substituted therefor which allows the axle of the vehicle to revolve without interfering with the connection of my supporting rods to the hub cap. After the supporting rods 28 have been attached as set forth in the foregoing, the rod 12 is then adjusted to its desired length and the clamp 21 connected to the arm 25 of the spindle 7 which allows the attachment to be moved in the direction in which the wheel is turned. When attaching the screen to the rear wheel of the vehicle the adjusting bar 12 is eliminated and in lieu thereof a supporting bar 40 is substituted which is connected to the rear spring in the manner set forth. When not being used, the side screen may be detached from the vehicle and folded into a small compass and placed in the tool box or other convenient place.

It is to be understood that the form of our invention herewith shown and described, is to be taken as a preferred example of the same, and that certain changes in the shape, size and arrangement of parts may be resorted to without departing from the spirit of the invention or the scope of the subjoined claim.

Having thus fully described our invention, we claim:—

A mud guard for vehicle wheels comprising a sectional frame extending diametrically across the lower portion of the wheel, said frame having one end bent to extend across the rear and along the inner side of the wheel, a bar having one end clamped to the spindle of the wheel and its opposite end adjustably joined to the inside portion of the frame, S shaped hooks depending from the frame, an apron suspended from the hooks having a plurality of brace strips for holding the former in a substantially stationary position, and means connecting the outer side of the frame with the hub.

In testimony whereof, we have affixed our signatures in the presence of two witnesses.

DOUGLAS ERICSON.
ERIC ERICSON.

Witnesses:
ERIC HAGMAN,
FRANK YOUNG.